United States Patent
Bensmann

(10) Patent No.: US 11,034,433 B2
(45) Date of Patent: Jun. 15, 2021

(54) WING FOR AN AIRCRAFT

(71) Applicant: Airbus Operations GmbH, Hamburg (DE)

(72) Inventor: Stefan Bensmann, Hamburg (DE)

(73) Assignee: Airbus Operations GmbH

( * ) Notice: Subject to any disclaimer, the term of this patent is extended or adjusted under 35 U.S.C. 154(b) by 492 days.

(21) Appl. No.: 15/959,755

(22) Filed: Apr. 23, 2018

(65) Prior Publication Data

US 2018/0312244 A1     Nov. 1, 2018

(30) Foreign Application Priority Data

Apr. 28, 2017   (DE) .................. 10 2017 004 089.3

(51) Int. Cl.
*B64C 9/22*      (2006.01)
*B64C 9/26*      (2006.01)
(Continued)

(52) U.S. Cl.
CPC .................. *B64C 9/22* (2013.01); *B64C 9/02* (2013.01); *B64C 9/24* (2013.01); *B64C 9/26* (2013.01); *B64C 9/28* (2013.01); *B64C 13/28* (2013.01)

(58) Field of Classification Search
CPC .... B64C 9/02; B64C 9/22; B64C 9/24; B64C 9/26; B64C 9/28; B64C 3/50
See application file for complete search history.

(56) References Cited

U.S. PATENT DOCUMENTS 1,917,428 A  *  7/1933  Burnelli ................... B64C 9/28
                                                        244/214
2,938,680 A      5/1960  Greene et al.
(Continued)

FOREIGN PATENT DOCUMENTS

CN       102143886 A       8/2011
CN       104903191 A       9/2015
(Continued)

OTHER PUBLICATIONS

Search Report from 1st Chinese Office Action for Application No. 201810389914.X dated Feb. 3, 2021; 3 pages (pp. 1 and 2 categorizing the cited references).
(Continued)

*Primary Examiner* — Nicholas McFall
(74) *Attorney, Agent, or Firm* — Lerner, David, Littenberg, Krumholz & Mentlik, LLP

(57) ABSTRACT

An aircraft wing includes a main wing having an outer skin defining an interior space of the main wing, a slat, and a connection assembly for movably connecting the slat to the main wing, such that the slat is movable in a predefined motion between a retracted position and at least one extended position. The assembly includes an elongate guide arranged within the interior space, a bearing at least partly arranged outside the interior space, an elongate slat track with a first end section connected to the slat and a second end section movably and rotatable connected to the guide, such that the second end section is movable along a predefined pathway defined by the guide while being connected to the main wing. An intermediate section of the slat track is movably and rotatably supported on the main wing, such that the guide and the bearing support the predefined motion.

10 Claims, 5 Drawing Sheets

(51) Int. Cl.
  *B64C 9/02* (2006.01)
  *B64C 9/24* (2006.01)
  *B64C 9/28* (2006.01)
  *B64C 13/28* (2006.01)

(56) References Cited

U.S. PATENT DOCUMENTS

| | | |
|---|---|---|
| 3,272,458 A | 9/1966 | Bracka |
| 4,360,176 A | 11/1982 | Brown |
| 2011/0168849 A1 | 7/2011 | Parker |
| 2013/0126670 A1 | 5/2013 | Vaghela |
| 2015/0291275 A1 | 10/2015 | Bastiaansen et al. |
| 2016/0083081 A1 | 3/2016 | Cowles, Jr. et al. |
| 2017/0073082 A1 | 3/2017 | Ungar et al. |

FOREIGN PATENT DOCUMENTS

| | | |
|---|---|---|
| EP | 0100775 A1 | 2/1984 |
| EP | 0781704 A1 | 7/1997 |
| EP | 2316727 A1 | 5/2011 |
| GB | 298 508 A | 10/1928 |
| GB | 2 204 538 A | 11/1988 |
| WO | 2016203256 A1 | 12/2016 |

OTHER PUBLICATIONS

DE 10 2017 004 089.3 Search Report dated Nov. 30, 2017.

\* cited by examiner

WING FOR AN AIRCRAFT

FIELD OF THE INVENTION

The present invention relates to a wing for an aircraft.

BACKGROUND OF THE INVENTION

The wing comprises a main wing having an outer skin defining an interior space of the main wing, a slat and a connection assembly for movably connecting the slat to the main wing, such that the slat is movable in a predefined motion between a retracted position and at least one extended position. The retracted position is preferably the position of the slat for cruise flight. In an example, one extended position of the slat may refer to the position of the slat for a takeoff. In an even further example, at least one extended position of the slat may be a position of slat for landing. The connection assembly may be configured such that the slat is movable in a predefined motion between the retracted position and the least one extended position, or vice versa.

Wings often employ a slat track to movably connect the slat to the main wing. The slat is usually connected to a first end section of the slat track, such that a movement of the slat track results in a corresponding movement of the slat, preferably along a predetermined a pathway. In order to achieve a higher lift effect of the wing, the slat will be moved to the extended position, for instance for takeoff or landing. In particular during cruise flight, the slat is moved back to the retracted position. The movement between the retracted position and the at least one extended positional is supported and/or ensured by the connection assembly. The connection assembly, however, may require a considerable space in the leading edge portion of the main wing, such that a front spar of the main wing usually has to be penetrated by the slat track, when the slat is move to the retracted position. In order to allow the slat track to penetrate the front spar of the main wing, an opening in the front spar may be necessary. However, the area behind the front spar of the main wing usually servers as the area for the fuel tank. As the result, a one side opened tube like space may be provided beginning with the opening in the front spar. This space may then serve for receiving the part of the slat track penetrating the front spar, when the slat is in the retracted position. As a result, a construction of the main wing with a possibility for a slat track to penetrate the front spar of the main wing may be of a complex construction.

BRIEF SUMMARY OF THE INVENTION

Accordingly, an aspect of the present invention may provide a wing for an aircraft with a more compact connection assembly, which is configured for movably connecting the slat to the main wing. In particular, it may be advanced, if the connection assembly is configured, such that the slat track does not penetrate the front spar, if the slat is in the retracted position.

A first aspect relates to a wing of an aircraft, wherein the wing comprises a main wing having an outer skin defining an interior space of the main wing, a slat, and a connection assembly for movably connecting the slat to the main wing, such that the slat is movable in a predefined motion between a retracted position and at least one extended position. The connection assembly comprises an elongate guide being arranged within the interior space of the main wing. The connection assembly further comprises a bearing, which is at least partly arranged outside the interior space of the main wing. The connection assembly further comprises an elongate slat track. The first end section of the slat track is connected to the slat. The second end section of the slat track is movably and rotatably connected to the guide, such that a second end section of the slat track is movable along a predefined pathway defined by the guide while being connected to the main wing via the guide. An intermediate section of the slat track is a movably and a rotatably supported on the main wing by the bearing, such that the guide and the bearing support the predefined motion.

As a result, the guide and the bearing are used to at least indirectly support the slat on the main wing, such that the slat is movable relative to the main wing between the retracted position and the at least one extended position. The guide is arranged within, in particular fully within, the interior space of the main wing. The bearing, however, is at least partly ranged outside the interior space of the main wing. As an effect, both, the guide and the bearing, can be arranged close to the forward leading edge of the main wing. As a further effect, the slat track can be designed with a short length in a longitudinal direction, in particular in a direction directed from the guide or the bearing towards the slat. In other words, the slat track may be short and compact. As a result, the slat may be moved from an extended position to the retracted position without requiring a large space in the leading edge portion of the main wing. In particular, it may be possible that even in the retracted position, there may be no need for the slat track to penetrate the front spar of the main wing. In this case, the front spar of the main wing may be of a reduced complexity and/or may even ensure a higher stiffness of the main wing.

The guide is preferably configured to movably and rotatably connect the second section of the slat track along the predefined pathway. For instance, the guide may be configured as a slide guide, a roller guide or another guide being configured to fulfill the respective function as described before.

The intermediate section of the slat track may refer to a section of the slat track being arranged between the first end section of the slat track and the second end section of the slat track. However, the intermediate section of the slat track does not necessary attach to the first end section and/or the second end section.

Supporting the predefined motion of the slat may refer to the ability and/or configuration of the guide and the bearing to guide the slat track and/or to keep the slat track movably/rotatably connected to the main wing during the predefined motion of the slat between the retracted position and the at least one extended position, or vice versa. In particular, this may refer to the configuration of the guide and the bearing, such that the predefined motion can be ensured.

In an example, the slat track may be configured as a straight slat track. Thus, the longitudinal direction of the slat track may at least basically correspond to a straight line. However, the slat track may be configured just partly as a straight slat track, in particular the part of the slat track being engaged with the bearing and/or the guide.

In a further example, the first end section of the slat track may be firmly connected to the slat. As a result, the slat may be a stationary fixed to the first end section of the slat track. However, other connections between the first end section of the slat track and the slat may also be possible.

According to a preferred embodiment of the wing, the main wing comprises a front spar, such that the front spar and the outer skin of the main wing define a front portion of the interior space, wherein the guide is fully arranged within the front portion of the interior space. As an effect, the guide does not penetrate the outer skin of the main wing and/or does not penetrate the front spar of the main wing. Accordingly, the guide would not require an increased complexity of the front spar of the main wing or a higher complexity of the outer skin. As an even further effect, the leading portion of the main wing can be constructed with less complexity.

According to a further preferred embodiment of the wing, the connection assembly and the slat track are configured, such that a second end section of the slat track remains within the front portion of the interior space of the main wing, if the slat is moved to the retracted position. By means of the connection assembly, the slat may be moved relative to the main wing from an extended position to the retracted position. As a result, the slat track is retracted towards the interior space of the main wing and/or into the interior space of the main wing. As described in the introduction, this has been led in the prior art to a penetration of the front spar. However, the connection assembly and the slat track of the present invention are configured, such that the second end section of the slat track remains within the front portion of the interior space of the main wing, even if the slat is moved to the retracted position. Thus, the slat track would not penetrate the front spar. The main wing, in particular the front spar, may therefore be constructed with less complexity.

According to a further preferred embodiment of the wing, a cover element is arranged outside the outer skin of the main wing, such that the cover element at least partly covers at least a part of the bearing being arranged outside the interior space of the main wing. The cover element may be referred to as a protective plate or a guard plate. As an effect, shelter may be kept away from the part of the bearing being arranged outside the interior space of the main wing. As an effect, the operation of the bearing may be ensured with higher reliability.

According to a further preferred embodiment of the wing, the guide is a straight guide, such that the pathway is a straight pathway. The straight guide may also be referred to a linear guide or a straight linear guide. A straight guide may result in a low technical complexity and/or in a high reliability.

According to a further preferred embodiment of the wing, the guide is a curved guide, such that at least a section of the pathway is curved. In an example, the total pathway may be curved or the pathway may be fully curved. The curvature is not necessarily constant. Instead, different sections of the pathway may have different curvature. In a further example, at least a section of the pathway is curved. Thus, another section of the pathway may not be curved, even though the guide is a curved guide. In an example, the guide may comprise a part having a straight form and at least on part having a curved form, such that the corresponding pathway defined by the guide may comprise a section, which is a straight section, and at least one further section, which is a curved, in particular fully curved, section. The curved guide and the resulting pathway as a curved pathway may provide the advantage that a movement of the slat via the connection assembly would avoid a collusion between the slat and the main wing while providing further advantages. For instance, the connection assembly, in particular its curved guide, may be configured such that the slat at least basically is initially moved forward and thereafter moved in a combined movement downwards and forward, such that the slat may be downward and forward of the forward leading edge of the main wing, if the slat is in an extended position. Furthermore, the curvature of the pathway may be adapted, such that at least two extended positions may be reached along the pathway, one after the other. One of the extended positions may refer to the take-off position of the slat, wherein the other extended position may relate to the landing position of the slat, or vice versa.

According to a further preferred embodiment of the wing, the guide is configured as a roller bearing guide. Such a roller bearing guide may also be a straight guide or a curved guide. Thus, reference may be made with respect to the previously provided explanations in an analogous manner. A roller bearing guide may further provide the advantage of a lower friction.

According to a further preferred embodiment of the wing, the bearing is configured as a roller bearing comprising a roller pair, wherein at least one roller of the roller pair is at least partly arranged outside the interior space of the main wing. In an example, one roller of the roller pair is partly or fully arranged outside the interior space of the main wing. Thus, said roller may be fully or partly arranged outside and/or above the leading edge portion of the main wing. The other roller of the roller pair may be arranged inside the interior space of the main wing. However, in an example, also the other roller of the roller pair may be partly or fully arranged outside the interior space of the main wing.

According to a further preferred embodiment of the wing, the intermediate section of the slat track is guided by the roller pair, such that each roller of the roller pair supports an opposite side of the intermediate section of the slat track. As an effect, a high guidance ability may be ensured.

According to a further preferred embodiment of the wing, the slat track comprises a tapered side profile, such that the intermediate section of the slat track is backlash-free supported on the main wing by the roller bearing. The central line of the guide may not be directly directed to a center point of the bearing. As a result, moving the slat from the extended position to the retracted position, or vice versa, may result in a rotation of the slat track about the center point of the bearing. In order to ensure a constant contact to the rollers of the roller bearing, the tapered side profile may result in a constant contact during the movement of the slat track, and thus in a backlash-free support on the main wing by the roller bearing. In an example, the slat track is tapered, such that the first end section of the slat track is wider than the second end section of the slat track, or vice versa.

According to a further preferred embodiment of the wing, the slat track comprises an H-cross-profile or an U-cross-profile resulting in at least one groove, wherein the roller pair engages with at least one groove.

According to a further preferred embodiment of the wing, a centerline of the guide differs from a centerline of the slat track, at least if the slat is moved to the retracted position. The different centerlines may have the effect that a movement of the slat from the retracted position to the at least one extended position may result initially in an at least basically forward movement of the slat and thereafter or finally in a combined movement of the slat comprising a forward movement component and a downward movement component. As a result, the slat may be positioned forward and downward to the forward leading edge of the main wing when being moved to the extended position.

A second aspect relates to an aircraft comprising at least one wing as described in the context of the first aspect of the present invention.

It is to be noted, that the preferred embodiments, features, effects and/or advantages, even though described previously in the context of the wing according to the first aspect of the present invention, may also relate in an analogous manner to the aircraft according to the second aspect of the present invention, at least in an analogous manner.

A third aspect relates to a connection assembly for movably connecting a slat to a main wing of an aircraft, such that the slat is movable in a predefined motion between a retracted position and at least one extended position. An elongate guide of the connection assembly is configured to be mechanically connected to at least one inner structural component of the main wing, such that the elongate guide of the connection assembly is arranged within an interior space being defined by an outer skin of the main wing. A bearing of the connection assembly is configured to be mechanically connected to at least on structural component of the main wing, such that the bearing is at least partly arranged outside the interior space of the main wing. The connection assembly comprises an elongate slat track. A first end section of the slat track is configured to be connected to the slat. A second end section of the slat track is movably and rotatable connected to the guide, such that the second end section of the slat track is movable along a predefined pathway defined by the guide. The bearing is configured to movably and rotatably support an intermediate section of the slat track on the main wing, such that the guide and the bearing support the predefined motion.

It is understood that, without repeating here all the explanations, examples, features, effects and/or advantages provided with reference to the wing for the aircraft, the connection assembly as such according to the third aspect of the present invention is intended to be configured to be connected to the structural components of the main wings, such that the effects of the wing comprising the respective connection assembly according to the first aspect of the invention can be provided. Thus, all the above provided examples, explanations, features, effects and/or advantages, although provided with reference to the connection assembly of the wing according to the first aspect of the invention, are also to be intended as being provided in an analogous manner for the connection assembly according to the third aspect of the present invention, in particular for at least one of the following embodiments of the connection assembly.

In an example, a structural component of the main wing may also be referred to as a wing structure. In a further example, the structural component may be at least one of a spar of the main wing, a rib of the main wing and/or a stringer of the main wing.

According to a preferred embodiment of the connection assembly, the connection assembly is configured to be mechanically connected to a leading edge rib of the main wing, a forward leading end section of a rib of the main wing, a leading edge skin, a forward leading end section of the skin, and/or a front spar.

According to a preferred embodiment of the connection assembly, the connection assembly is configured, such that the guide of the connection assembly is fully arrangeable within a front portion of the interior space of the main wing, wherein the main wing comprises a front spar, such that the front spar and the outer skin of the main wing define the front portion of the interior space.

According to a further preferred embodiment of the connection assembly, the connection assembly and the slat track are configured to be attached to at least one structural component of the wing, such that the second end section of the slat track remains within the front portion of the interior space, if the slat is moved to the retracted position.

According to a further preferred embodiment of the connection assembly, the guide is a straight guide, such that the pathway is a straight pathway.

According to a further preferred embodiment of the connection assembly, the guide is a curved guide, such that at least a section of the pathway is curved.

According to a further preferred embodiment of the connection assembly, the guide is configured as a roller bearing guide.

According to a further preferred embodiment of the connection assembly, the intermediate section of the slat track is guided by the roller pair, such that each roller of the roller pair supports an opposite side of the intermediate section of the slat track.

According to a further preferred embodiment of the connection assembly, the slat track comprises a tapered side profile, such that the intermediate section of the slat track is backlash-free supported on the main wing by the roller bearing.

According to a further preferred embodiment of the connection assembly, the slat track comprises an H-cross-profile or a U-cross-profile resulting in at least one groove, and wherein the roller pair engages with the at least one groove.

According to a further preferred embodiment of the connection assembly, a center line of the guide differs from a center line of the slat track, at least if the slat is moved to the retracted position. According to a further preferred embodiment of the connection assembly, the connection assembly comprises at least a part of a rip for a main wing of an aircraft, wherein the guide of the connection assembly is pre-connected to the part of the rip, such that at least the part of the rip is configured to be mechanically connected to at least one further structural component of the main wing, such that the guide of the connection assembly is arranged within an interior space of the main wing.

According to a further preferred embodiment of the connection assembly, the connection assembly comprises at least the or a part of a/the rip for a main wing of an aircraft, wherein the bearing of the connection assembly is pre-connected to the part of the rip, such that at least the part of the rip is configured to be mechanically connected to at least one further structural component of the main wing, such that the bearing is at least partly arranged outside the interior space of the main wing.

BRIEF DESCRIPTION OF THE DRAWINGS

Further features, advantages and application possibilities of the present invention may be derived from the following description of exemplary embodiments and/or the drawings. Thereby, all described and/or visually depicted features for themselves and/or in any combination may form an advantageous subject matter and/or features of the present invention independent of their combination in the individual claims or their dependencies. Furthermore, in the drawings, same reference signs may indicate same or similar objects.

DETAILED DESCRIPTION

Figure 1:
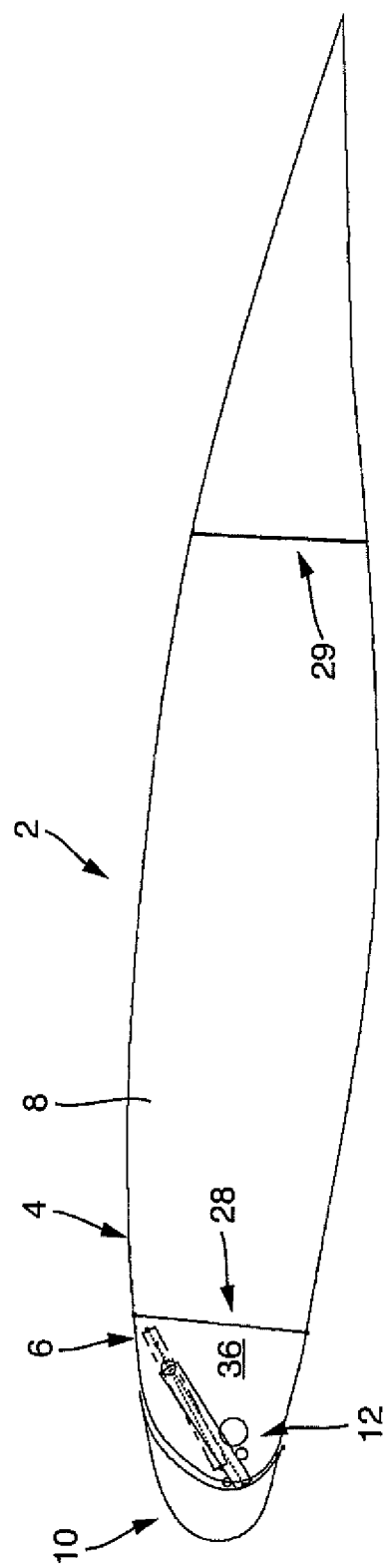
FIG. 1 schematically illustrates a cross-sectional view across the wingspan direction of a first embodiment of the wing for an aircraft according to the present invention.
Figure 5:
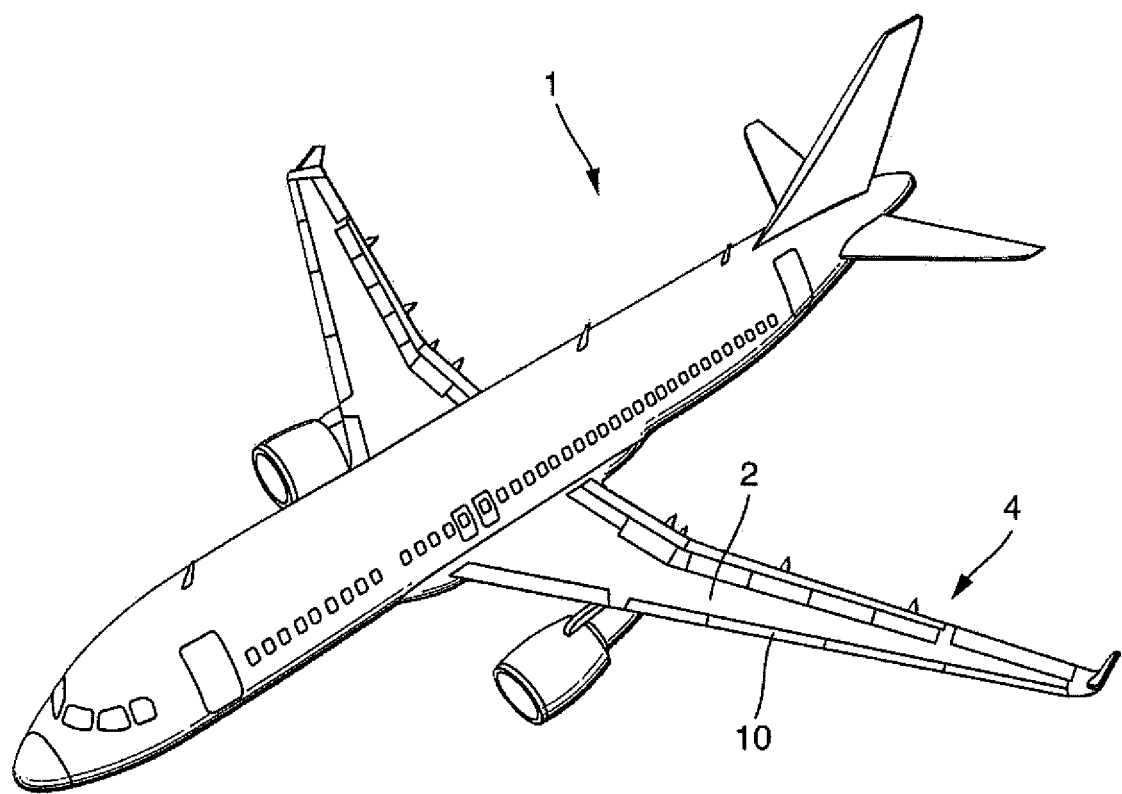
FIG. 5 schematically illustrates a view of an aircraft according to the present invention.

FIG. 1 schematically illustrates the wing (2) for an aircraft (1) in a cross-sectional view according to a preferred embodiment of the present invention. An example of an aircraft is schematically illustrated in FIG. 5.

The wing (2) comprises the main wing (4), a connection assembly (12) and a slat (10). An outer skin (6) of the main wing (4) defines an interior space (8) of the main wing (4). The interior space (8) is preferably divided by rips and spars (28. 29). In an example, the main wing (4) comprises at least a front spar (28) and a rear spar (29). Thus, the front spar (28) and the outer skin (6) of the main wing (4) preferably define a front portion (30) of the interior space (8).

Figure 2:
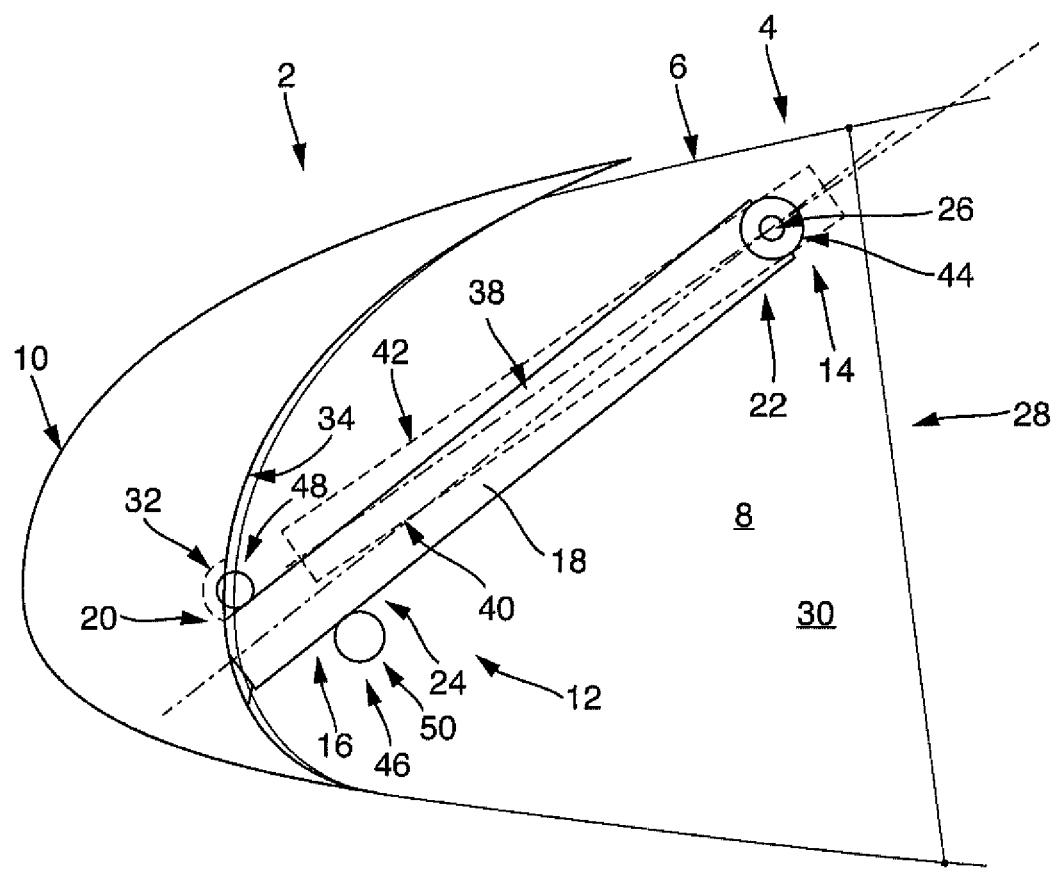
FIG. 2 schematically illustrates a cross-sectional view of a second embodiment of a part of the wing for an aircraft according to the present invention.
Figure 3:
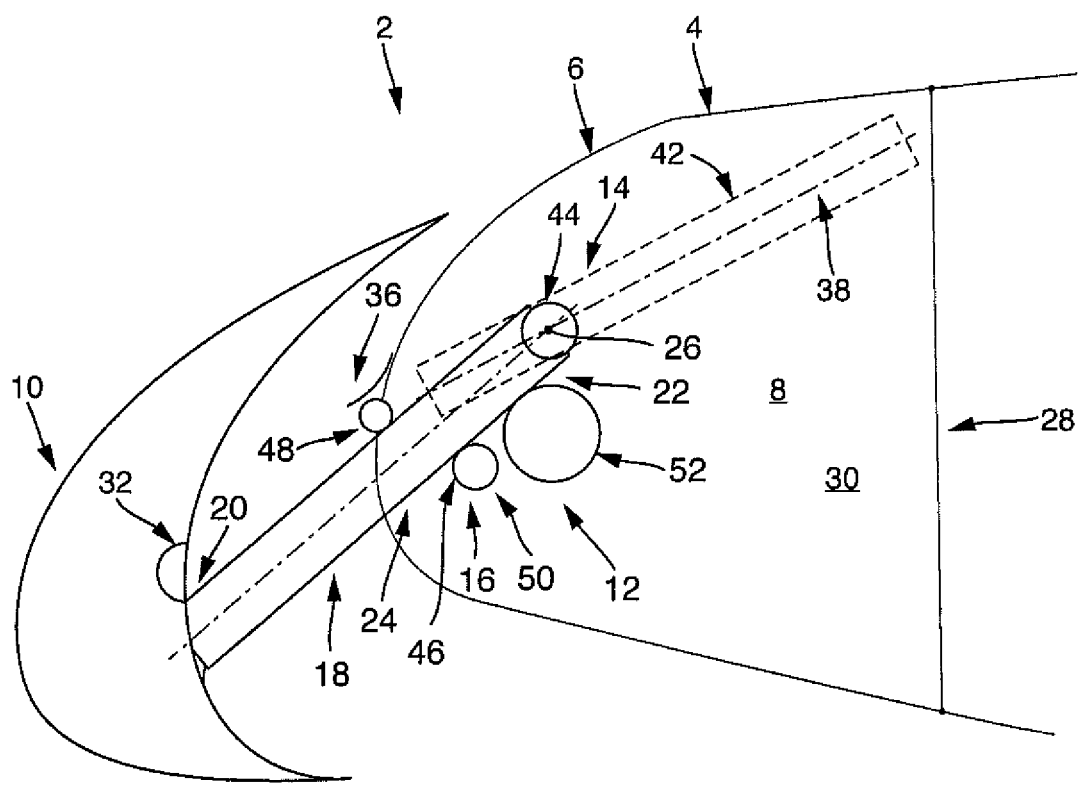
FIG. 3 schematically illustrates a cross-sectional view of a third embodiment of a part of the wing for an aircraft according to the present invention.
Figure 4:
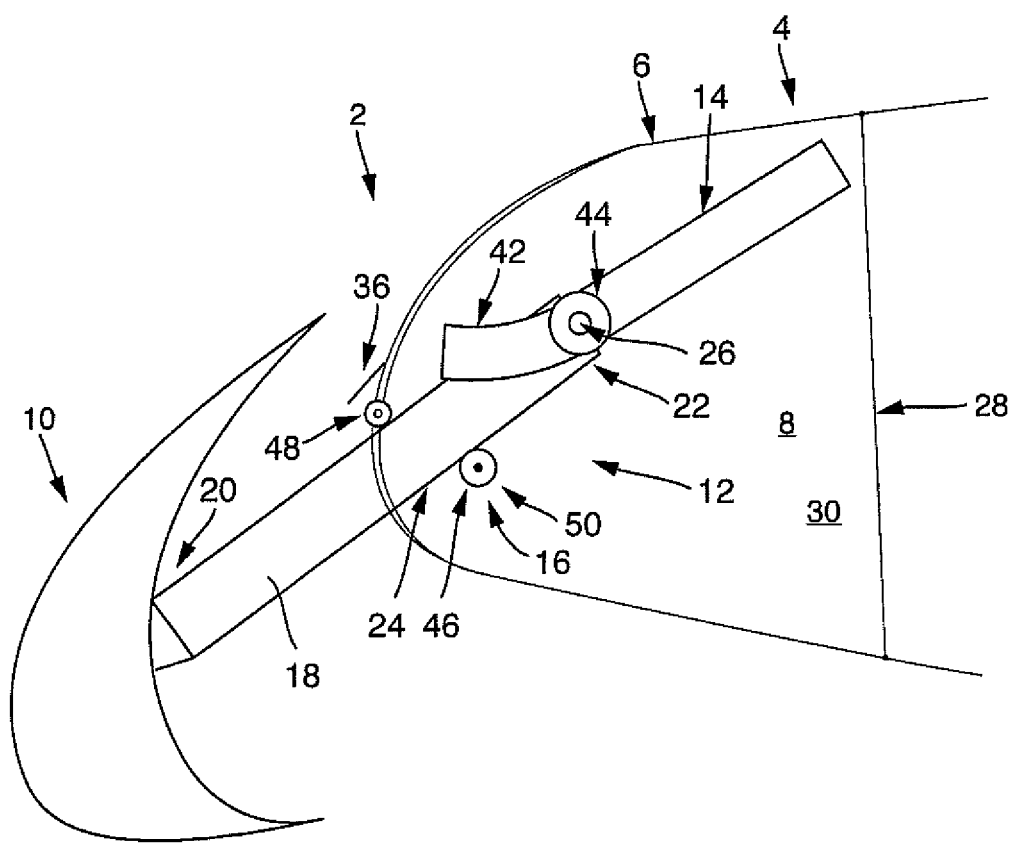
FIG. 4 schematically illustrates a cross-sectional view of a fourth embodiment of a part of the wing for an aircraft according to the present invention.

FIGS. 2 to 4 schematically illustrate embodiments of a forward leading part of the wing (2). As exemplarily illustrated in FIG. 2, the connection assembly (12) is configured for movably connecting the slat (10) to the main wing (4). The connection assembly (12) is further configured, such that the slat (10) is movable relative to the main wing (4) in a predefined motion between a retracted position and at least one extended position. FIG. 2 schematically illustrates the slat (10) being moved to the retracted position.

FIG. 3 schematically illustrates basically the same wing (2) as illustrated in FIG. 2, however, the slat (10) is moved to an extended position. As a result, the connection assembly (12) allows to move and/or guide the slat (10) between the retracted position and the extended position, or vice versa.

The connection assembly (12) comprises an elongate guide (14) being arranged within the interior space (8) of the main wing (4). Thus, the guide (14) is arranged inside the main wing (4), namely within its interior space (8). Further, the guide (14) is preferably connected to internal structural components of the main wing (4). For instance, the guide (14) may be connected to at least one spar, at least one rib and/or at least one stringer. Thus, the guide (14) may be mechanically fixed within the main wing (4).

The connection assembly (12) further comprises a bearing (16). The bearing (16) is preferably configured as a roller bearing or a slide bearing. The bearing (16) is at least partly arranged outside the interior space (8) of the main wing (4).

Furthermore, the connection assembly (12) comprises an elongate slat track (18). A first end section (20) of the slat track (18) is connected to the slat (10). This connection may be a firmly fixed connection. A second end section (22) of the slat track (18) is movably and rotatably connected to the guide (14), such that the second end section (22) of the slat track (18) is movable along a predefined pathway defined by the guide (14) while being connected to the main wing (4) via the guide (14). Further, an intermediate section (24) of the slat track (18) is movably and rotatably supported on the main wing (4) by the bearing (16), such that the guide (14) and the bearing (16) support the predefined motion of the slat.

As a result from the connection between the second end section (22) of the slat track (18) and the guide (14), a connection point (26), defining the actual point of connection between the intersection (22) of the slat track (18) and the guide (14), may move along the predefined pathway of the guide (14), if the second end section (22) of the slat track (18) is moved along the predefined pathway. Thus, when moving the slat (10) from the retracted position to the extended position, the connection point (26) moves toward the bearing (16). In order to allow as low as possible forces acting on the bearing (16) and/or the guide (14), it is desirable to keep the distance between the connection point (26) and the bearing (16) as large as possible.

It has been found that the distance between the connection point (26) and the bearing (16) can be increased, in particular as large as possible, if at least a part of the bearing (16) is arranged outside the interior space (8) of the main wing (4). In an example, at least a part of the bearing (16) is extending forward to the forward leading edge of the main wing (4). As a further result of arrangement of the bearing (16) such that at least being partly outside the interior space (8) of the main wing (4), the guide (14) can be arranged closer to the forward leading edge of the main wing (4). As an effect, the length of the slat track (18) between the first end section (20) and the opposite, second end section (22) may be decreased and/or considerable short. In an example, the length of the slat track (18) may be limited to a length, such that the second end section (22) of the slat track (18) would not penetrate the front spar (28) of the main wing (4), if the slat (10) is moved to its retracted position, for instance as it is schematically illustrated in FIG. 2.

In an example, the main wing (4) comprises a front spar (28) such that the front spar (28) and the outer skin (6) of the main wing (4) define a front portion (30) of the interior space (8). Thus, the front portion (30) of the interior space (8) may relate to the interior space (8) defined by a so call D-section of the main wing (4). It is preferred that the guide (14) is fully arranged within the front portion (30) of the interior space (8). Thus, the guide (14) may not penetrate the outer skin (6) and/or may not penetrate the front spar (28) of the main wing (4). Furthermore, the second end section (22) of the slat track (18) is movably and rotatably connected to the guide (14), such that the second end section (22) of the slat track (18) is movable along the predefined pathway defined by the guide (14). As a result, the second end section (22) of the slat track (18) is prevented from being penetrated through the outer skin (6) of the main wing (4) and/or prevented from being penetrated through the front spar (28). Instead, the connection assembly (12) and the slat track (18) may be configured, such that the second end section (22) of the slat track (18) remains (in particular always) within the front portion (30) of the interior space (8), in particular even if the slat (10) is moved to the retracted position.

As an effect, the slat track (18) not penetrating the front spar (28) results in a reduced complexity of the wing (2), in particular the main wing (4). At the same time, mechanical requirements may be met, since the bearing (16) is at least partly arranged outside the interior space (8), in particular outside the front portion (30) of the interior space (8). This results in the effect, that a, in particular predefined, minimum distance between the bearing (16) and the second end section (22) of the slat track (18) or the connection point (26) may be ensured. Thus, the mechanical forces applied to the bearing (16) and/or the guide (14) during the operation of the wing (2) may be limited to an acceptable amount.

The skin section (34) of the slat (19) facing the forward the leading edge of the main wing (4) may comprise a recess (32). The recess (32) may be arranged, such that the part of the bearing (16) extending above the outer skin (6) of the main wing (4) and/or outside the interior space (8) of the main wing (4) may engage with the recess (32), if the slat (10) is moved to the retracted position.

It has been found of advantage, if at least the part of the bearing (16) being arranged outside the interior space (8) of the main wing (4) is protected from shelter. In an example, a cover element (36) is arranged outside the outer skin (6) of the main wing (4), such that the cover element (36) at least partly covers at least a part of the bearing (16) being arranged outside the interior space (8) of the main wing (4). Thus, the cover element (36) may be arranged outside the outer skin (6) of the main wing (4) and above the part of the bearing (16) extending outside the outer skin (6) of the main wing (4). As an effect, the reliability of the bearing (16) may be increased.

It has been found of advantage, if the guide (14) is configured as a straight guide, such that the pathway defined by the straight guide as a straight pathway. Such a straight guide may result in a high reliability. In an example, the straight pathway corresponds to and/or coincides with a center line (38) of the guide (14). Thus, moving the slat (10) from the retracted position to the extended position, or vice versa, may result in a movement of the connection point (26) along the center line (38) of the guide (14).

FIG. 2 schematically illustrates the slat (10) being moved to the retracted position. If the slat (10) is in its retracted position, a (further) center line (40) of the slat track (18) differs and/or virtually intersects with the center line (38) of the guide (14). As a result, the center line (40) of the slat track (18) may be pivoted about a center point of the bearing (16) while the slat (10) is moved from the retracted position to the extended position. As a result, the slat (10) is initially moved forward and thereafter being moved forward and downward relative to the main wing (4). In its extended position, the slat (10) may therefore be forward and lower than as its retracted position. In order to prevent a backlash between the slat track (18) and the bearing (16), the slat track (18) may comprise a tapered side profile, such that the intermediate intersection (24) of the slat track (18) is backlash-free supported on the main wing (4) by the bearing (16), in particular configured as a roller bearing. As a result, the reliability of the wing (2) may be increased.

FIG. 4 schematically illustrates a further embodiment of the wing (4). It is to be noted, that references may be made to the previous explanations, examples, effects and/or advantages as described in connection with the FIGS. 1 and 2 in an analogous manner. However, the guide (14) illustrated in FIG. 4 is not a straight guide, but configured as a curved guide. Thus, references may not be made to the specific explanations regarding the straight guide (14).

The curved guide (14) exemplarily illustrated in FIG. 4 results in a curved pathway or at least in a curved section of the pathway. As schematically illustrated in FIG. 4, the pathway defined by the guide (14) may comprise at least one straight section and at least one curved section. A guide (14) providing such a pathway may be referred to as a curved guide (14). The slat track (18) is movably and rotatably supported on the main wing (4) by the bearing (16) and the guide (14), such that the guide (14) and the bearing (16) support the predefined motion of the slat (10) between the retracted position and at least one extended position. FIG. 4 schematically illustrates the slat (10) being in a first extended position. If the second end section (22) of the slat track (18) is further moved along the curved pathway defined by the curved guide, the slat (10) will be subject to a combined movement, comprising a forward component and a downward component. Thus, the curvature of the pathway may be of advantage, if the slat (10) is to be moved initially forward and thereafter with a higher component part downward. Furthermore, such a curved guide (14) and/or its respective curved pathway may provide the basis for more than one extended positions for the slat (10). In particular, the curved guide (14) may allow a first extended position for take-off and a second extended position for landing, or vice versa.

In an example, the guide (14), in particular configured as a straight guide or a curved guide, may also be configured as a roller bearing guide. For example, the roller bearing guide may comprise a guidance rail (42) and a guidance roller (44). The guidance roller (44) may be rotatably connected to the second end section (22) of the slat track (18) and further engages with the guidance rail (42), such that the guidance rail (42) guides the guidance roller (44) along the pathway defined by the guide (14). As an effect, the guidance rail (42) and the guidance roller (44) may engage with each other, such that the second end section (22) of the slat track (18) is movable along the predefined pathway of the guide (14) while being connected to the main wing (4) via the guide (14).

As indicated earlier, the bearing (16) may be configured as a roller bearing (16). The roller bearing (16) may comprise a roller pair (46). The roller pair (46) may comprise a first roller (48) and a second roller (50). As indicated schematically and exemplarily in the FIGS. 1-3, it may be preferred, that at least the first roller (48) of the roller pair (46) is at least partly arranged outside the interior space (8) of the main wing (4). As a result, the roller bearing (16) comprising the roller pair (46) may be arranged in an area close to the forward leading edge of the main wing (4).

In a further example, the intermediate intersection (24) of the slat track (18) is guided by the roller pair (46), such that each roller (48, 50) of the roller pair (46) supports an opposite side of the intermediate section (24) of the slat track (18). As a result, a well-defined guidance for the slat track (18) may be provided.

According to a further preferred example, the wing (2) may comprise a drive unit (52). The drive unit (52) may be arranged in the interior space (8), in particular in the front portion (30) of the interior space (8) of the main wing (4). The drive unit (52) is preferably configured to directly or at least indirectly drive the slat track (18), such that the slat track (18) can be driven in order to move the slat (10) between the retracted position and the at least one extended position or vice versa.

According to a further example, an aircraft (1) may comprise a wing (2) as exemplary described above. An aircraft (1) is schematically illustrated in FIG. 5.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
 a main wing having an outer skin defining an interior space of the main wing;
 a slat; and
 a connection assembly for movably connecting the slat to the main wing, such that the slat is movable in a predefined motion between a retracted position and at least one extended position, wherein the connection assembly comprises an elongate guide being arranged within the interior space of the main wing, wherein the connection assembly comprises a bearing, which is at least partly arranged outside the interior space of the main wing, wherein the connection assembly comprises an elongate slat track, wherein a first end section of the slat track is connected to the slat, wherein a second end section of the slat track is movably and rotatably connected to the guide, such that the second end section of the slat track is movable along a predefined pathway defined by the guide while being connected to the main wing via the guide, wherein an intermediate section of the slat track is movably and rotatably supported on the main wing by the bearing, such that the guide and the bearing support the predefined motion, and wherein the main wing comprises a front spar, such that the front spar and the outer skin of the main wing define a front portion of the interior space, wherein the guide is fully arranged within the front portion of the interior space.

2. The wing according to claim 1, wherein the connection assembly and the slat track are configured, such that the second end section of the slat track remains within the front portion of the interior space, if the slat is moved to the retracted position.

3. The wing according to claim 1, wherein a cover element is arranged outside the outer skin of the main wing, such that the cover element at least partly covers at least the part of the bearing being arranged outside the interior space of the main wing.

4. The wing according to claim 1, wherein the guide is a straight guide, such that the pathway is a straight pathway.

5. The wing according to claim 1, wherein the guide is a curved guide, such that at least a section of the pathway is curved.

6. The wing according to claim 1, wherein the guide is configured as a roller bearing guide.

7. The wing according to claim 1, wherein the bearing is a roller bearing comprising a roller pair, and
wherein at least one roller of the roller pair is at least partly arranged outside the interior space of the main wing.

8. The wing according to claim 7, wherein the intermediate section of the slat track is guided by the roller pair, such that each roller of the roller pair supports an opposite side of the intermediate section of the slat track.

9. A wing for an aircraft, comprising:
a main wing having an outer skin defining an interior space of the main wing;
a slat; and
a connection assembly for movably connecting the slat to the main wing, such that the slat is movable in a predefined motion between a retracted position and at least one extended position,
wherein the connection assembly comprises an elongate guide being arranged within the interior space of the main wing,
wherein the connection assembly comprises a bearing, which is at least partly arranged outside the interior space of the main wing,
wherein the connection assembly comprises an elongate slat track,
wherein a first end section of the slat track is connected to the slat,
wherein a second end section of the slat track is movably and rotatably connected to the guide, such that the second end section of the slat track is movable along a predefined pathway defined by the guide while being connected to the main wing via the guide,
wherein an intermediate section of the slat track is movably and rotatably supported on the main wing by the bearing, such that the guide and the bearing support the predefined motion, and
wherein a center line of the guide differs from a center line of the slat track, at least if the slat is moved to the retracted position.

10. An aircraft comprising at least one wing according to claim 1.

* * * * *